United States Patent [19]

Oikawa et al.

[11] Patent Number: 5,281,330
[45] Date of Patent: Jan. 25, 1994

[54] WATER PURIFIER

[75] Inventors: Yukio Oikawa, Kariya; Isamu Shigeta, Toyota; Shiro Saito, Tokoname, all of Japan

[73] Assignees: Nippondenso Co., Ltd., Kariya; Inax Corporation, Tokoname, both of Japan

[21] Appl. No.: 586,960

[22] Filed: Sep. 24, 1990

[30] Foreign Application Priority Data

Apr. 20, 1990 [JP] Japan .................................. 2-106286

[51] Int. Cl.$^5$ .......................................... B01D 35/06
[52] U.S. Cl. .................................. 210/85; 204/240; 204/249; 204/305; 210/87; 210/97; 210/136; 210/243; 210/440
[58] Field of Search .............. 204/152, 231, 229, 240, 204/249, 276, 302, 305, 306; 210/85, 87, 97, 143, 243, 748, 106, 93, 94, 497.01, 136; 324/433, 426, 427; 340/636; 422/22, 119

[56] References Cited

U.S. PATENT DOCUMENTS

| | | | |
|---|---|---|---|
| 3,252,885 | 5/1966 | Griswold | 210/243 |
| 4,119,517 | 10/1978 | Hengst | 204/229 |
| 4,451,341 | 5/1984 | Miller | 204/229 |
| 4,762,611 | 8/1988 | Schipper | 210/85 |

FOREIGN PATENT DOCUMENTS

| | | | |
|---|---|---|---|
| 52-14061 | 2/1977 | Japan | 204/152 |
| 55-37913 | 3/1980 | Japan | 340/636 |
| 60-114763 | 6/1985 | Japan | 210/243 |
| 60-257818 | 12/1985 | Japan | 204/302 |
| 61-97093 | 5/1986 | Japan | 204/152 |
| 61-201177 | 9/1986 | Japan | 340/636 |
| 1-99684 | 4/1989 | Japan | 204/229 |
| 2-191588 | 7/1990 | Japan | 210/243 |

OTHER PUBLICATIONS

Matsunaga, Tadashi; Namba, Yoichi; and Nakajima, Toshiaka, "Electrochemical Sterilization of Microbial Cells," Bioelectrochemistry and Bioenergetics, 13 (1984) 393–400.

Kawamoto, Ryuichi, "(6-12) Research on Low-Voltage Sterilization System for Home-Service Water Purifier," 41st All Japan Waterworks Research Report Meeting, 6, Water System Branch, May 1990, pp. 475–477.

*Primary Examiner*—Joseph W. Drodge
*Attorney, Agent, or Firm*—Cushman, Darby & Cushman

[57] ABSTRACT

A water purifying apparatus of compact construction. The water purifying apparatus has a water channel for receiving water via an inflow passage and discharging water via an outflow passage. An electrically conductive filter is disposed in and fully occupies a portion of the water channel for purifying water flowing through the filter. A first electrode is electrically connected to the filter, and a second electrode, disposed in the filter, is electrically connected to the filter via water flowing through the filter. A battery supplies voltage between the first and second electrodes. A switch controls application of the voltage from the batteries to the first and second electrodes. A circuit board having a control circuit is disposed above the first electrode, the second electrode and the switch. The circuit board is electrically connected to the various electronic components.

12 Claims, 4 Drawing Sheets

WATER PURIFIER

BACKGROUND OF THE INVENTION

1. Field of the Invention

This invention relates to a water purifier.

2. Description of the Related Art

In a conventional water purifier having a filter for removing minute inorganic material, organic material, residual chlorine, etc. which exist in waterworks, in order to suppress breeding of microorganisms in the filter, an electrically conductive filter is used to act as a first electrode, with a second opposite electrode disposed in a water flow channel in the water purifier. A voltage is continuously applied between both electrodes by a battery.

The inventors have studied carefully the breeding of microorganisms in a the filter and have found that the breeding of microorganisms, such as bacteria, tends to occur when water stagnates in the filter.

In other words, the breeding of microorganisms in the filter tends to occur when water stagnates in the filter, but it hardly occurs when water flows through the water purifier.

A problem found by the inventors in connection with the conventional water purifier is that the constant application of a voltage of a battery between the electrodes causes consumption of the battery and makes it difficult to assure long-term use of the battery.

Another problem found by the inventors, in connection with the water purifier having a voltage applied between the electrodes therein, is that in addition to the fact that a decrease in the battery voltage to be applied reduces the effect of suppressing the breeding of microorganisms, consumption of the battery can not be checked externally and the user can not decide whether exchange of the battery due to consumption thereof is needed or not.

SUMMARY OF THE INVENTION

A first object of the present invention is to provide a water purifier having electrodes between which a voltage is applied by using a battery, which water purifier eliminates the necessity of exchange of the battery over a long period of time and suppresses breeding of microorganisms over a long period of time.

A second object of the present invention is to provide a water purifier which prevents an accelerated reduction in the lifetime of the battery, and, when the battery becomes exhausted, timely informs the user of the state of the battery.

The water purifier of the present invention comprises an electrically conductive filter disposed in a water channel in the water purifier. The water channel is filled with water when at least water flow therethrough is stopped, and acts as a first electrode. A second electrode electrically insulated from the filter is disposed in the water channel, and a battery is provided for applying a voltage between the first and second electrodes.

A first embodiment of this application is featured by comprising: water flow detection means for detecting the fact that water is flowing through the water channel; and voltage application means for applying a voltage of the battery between the first and second electrodes when water flow is not detected by the water flow detection means.

A second embodiment of this application is featured by comprising: water flow detection means for detecting the fact that water is flowing through the water channel; voltage discrimination means for checking whether the voltage of the battery exceeds a predetermined voltage value; and display means for indicating whether the battery voltage exceeds the predetermined voltage value when water flow is detected by the water flow detection means.

In the first embodiment the battery voltage is not applied between the first and second electrodes when water is flowing through the water channel, while the battery voltage is applied between the first and second electrodes when water does not flow through the water channel. Thus when water stagnates in the water channel, a situation where the breeding of microorganisms tend to occur, it possible to suppress the breeding of microorganisms through the voltage application.

Generally, in a water channel where a filter is disposed, when water is flowing through the water channel; such breeding of microorganisms hardly occurs, and therefore, no breeding problem arise even if a voltage is not applied between the first and second electrodes.

In the second embodiment, a decision as to whether the battery voltage exceeds the predetermined voltage value necessary for suppressing the breeding of microorganisms and a display of the result of the decision are effected only during the water flow time period.

Generally, in water supply equipment having a water purifier mounted on a faucet or the like in the water works, a time period during which water is made to flow is generally much shorter than a time period during which water flow is stopped.

Accordingly, if the decision on the magnitude of the battery voltage and the display of the result of decision are effected each time water flows through the water purifier, that is, only when the user is allowed to have many chances of looking at a display of the result of decision on the magnitude of the battery voltage, it is possible to reduce battery power consumption necessary for effecting the decision and display with respect to the battery voltage.

The present invention provides the following meritorious effects.

In accordance with the first embodiment, the voltage of the battery is not applied between the electrodes during the water flow time period, which is useful in reducing battery consumption. Thus, the voltage application between the electrodes during the time period of stagnation of water, in which the breeding of microorganisms should be suppressed, can be continued over a long period of time.

In accordance with the second embodiment, the discrimination of the magnitude of the battery voltage is effected and the result of discrimination is displayed when water flows through the water channel. Thus, the necessity of exchange of the battery due to exhaustion thereof can be determined easily.

In this case, the discrimination as to whether the battery is exhausted or not and the display of the result of discrimination are effected within a relatively short water flow time. Thus, the battery power consumption therefor can be reduced remarkably.

Accordingly, the power supply battery can be used over a long period of time.

DESCRIPTION OF THE PREFERRED EMBODIMENTS

Figure 1:
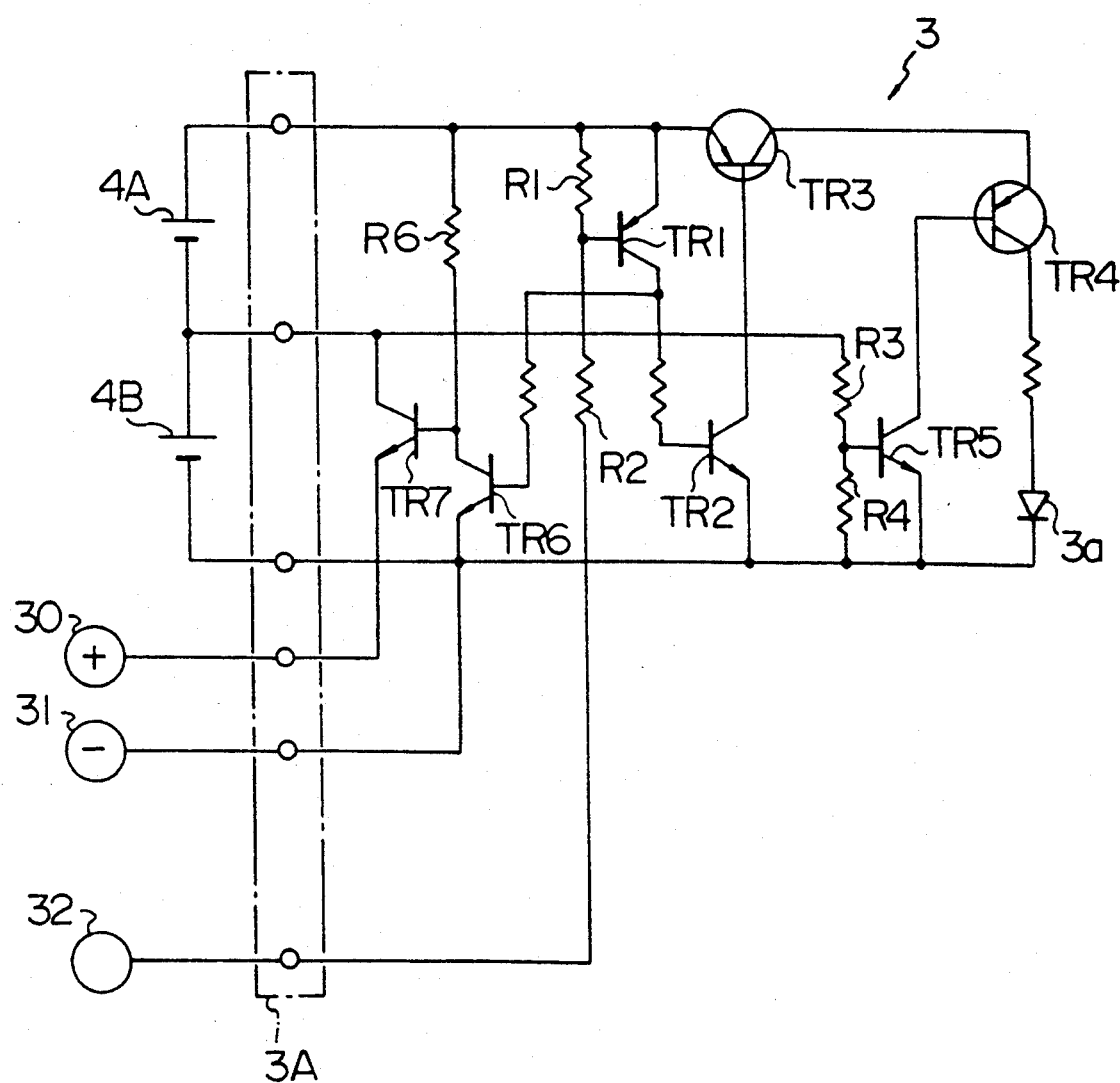
FIG. 1 is a circuit diagram showing the electric circuit of a control circuit board in the embodiment of the present invention.

An embodiment of the present invention will be described hereunder by making reference to the accompanying drawings. A water purifier 1 shown in FIG. 2 comprises a filter unit 2, a control circuit board 3, two batteries 4A and 4B, an outer cover 5 and a battery cover 6. The water purifier 1 is fixed to a faucet used in water works through an adapter 7.

The filter unit 2 includes a filter case composed of a cylindrical main case 21 having one open end and a filter 22 arranged therewithin, an inner lid 23 so disposed as to block up the open end of the main case 21, and an outer lid 24 disposed to cover the inner lid 23.

On the inner side surface of an upper wall 21a of the main case 21, six downwardly projecting filter supports 21b are disposed extending radially. The filter supports 21b are kept in contact with the filter 22 to support it, and the filter supports 21b define therebetween radial spaces acting as outflow paths 21c (indicated by dotted lines) through which water passing through the filter 22 can flow out.

Respective lower open ends of the flowout paths 21c, which face the filter 22, are covered with a mesh 21d made of a synthetic fiber. This mesh 21d is fixed to each of the filter supports 21b at the time of formation of the main case 21.

The filter 22 is formed of an active carbon fiber layer which has been formed to be fully permeable to water and has a density of 0.17 g/cm$^3$, for example.

Formed in the upper wall 21a are funnel-shaped electrode insertion holes 25a, 25b and 25c in which there are inserted respectively a positive electrode 30, a negative electrode 31, and a detection electrode 32, each thereof having a lead wire and being made of a carbon rod, for example, and being fixed with an epoxy adhesive 26.

The positive electrode 30 penetrates the filter support 21b and is inserted in the filter 22 making electrical contact therewith, thereby causing the filter 22 to function as a part of the positive electrode 30.

Under the electrode insertion hole 25b in which the negative electrode 31 is inserted and supported, an insulating sleeve 21e formed integrally with the upper wall 21a penetrates the filter 22 and is fitted in the inner lid 23, and the negative electrode 31 extends through the insulating sleeve 21e and the inner lid 23 to project from the inner lid 23 and to abut against the outer lid 24.

The detection electrode 32 is disposed to detect whether the outflow paths 21c formed between the adjacent filter supports 21b are filled with water or not. The detection electrode 32 projects slightly from the inner side surface of the upper wall 21a so that the length of its portion projecting downwardly from the upper wall 21a is shorter than the height of the filter supports 21b.

A pipe member 27 having six legs 27a at one end thereof is bonded fixedly to the inner central portion of the upper wall 21a to extend downwardly, and the upper end portion of the pipe member 27 communicates with the outflow paths 21c through gaps between adjacent legs 27a.

The upper surface of each of the legs 27a is so curved as to keep away from the detection electrode 32 slightly projecting from the upper wall 21a. This configuration ensures that, when the inflow of water into the water purifier 1 is stopped, water in the outflow paths 21c drops downward easily and does not remain bridging between the leg 27a and the detection electrode 32 due to the surface tension of water.

The inner lid 23 having a form of a substantially circular disk corresponding to the main case 21, supports the filter 22 at its lower side and has a plurality of inflow holes 23a formed corresponding to the outflow paths 21c in the main case to act as open spaces through which water flows into the filter 22.

The upper side of the opening of each inflow hole 23a facing the filter 22 is covered with a mesh 23b made of a synthetic fiber which is fixed to the inner lid 23 at the time of formation thereof.

The central portion of the inner lid 23 is formed to be integral with a boss 23c, which is fitted into the pipe 27. The central portion of the inner lid 23 is also formed to be integral with a pipe portion 23d which is positioned on the opposite side to the boss 23c and defines a drain pipe in conjunction with the pipe member 27.

The outer lid 24 is fitted to an outer cylinder portion 21f of the main case 21 to confine the inner lid 23 therein, and it defines, between the outer and inner lids 24 and 23, an inflow path 24A which communicates with the inflow holes 23a.

Disposed at the lower portion of the outer lid 24 is an inflow pipe 24a which is formed to confine therein the pipe portion 23d of the inner lid 23. Disposed in the inflow path 24A is a check valve 28 which is fixed to the pipe portion 23d, and which prevents the counterflow of water within the inflow path 24A, the inflow holes 23a and the filter 22 into the inflow pipe 24a, when the inflow of water from the inflow pipe 24a is stopped.

The filter 22 has holes through which the aforementioned insulating sleeve 21e and the pipe member 27 penetrate and in which the positive electrode 30 is inserted.

Figure 2:
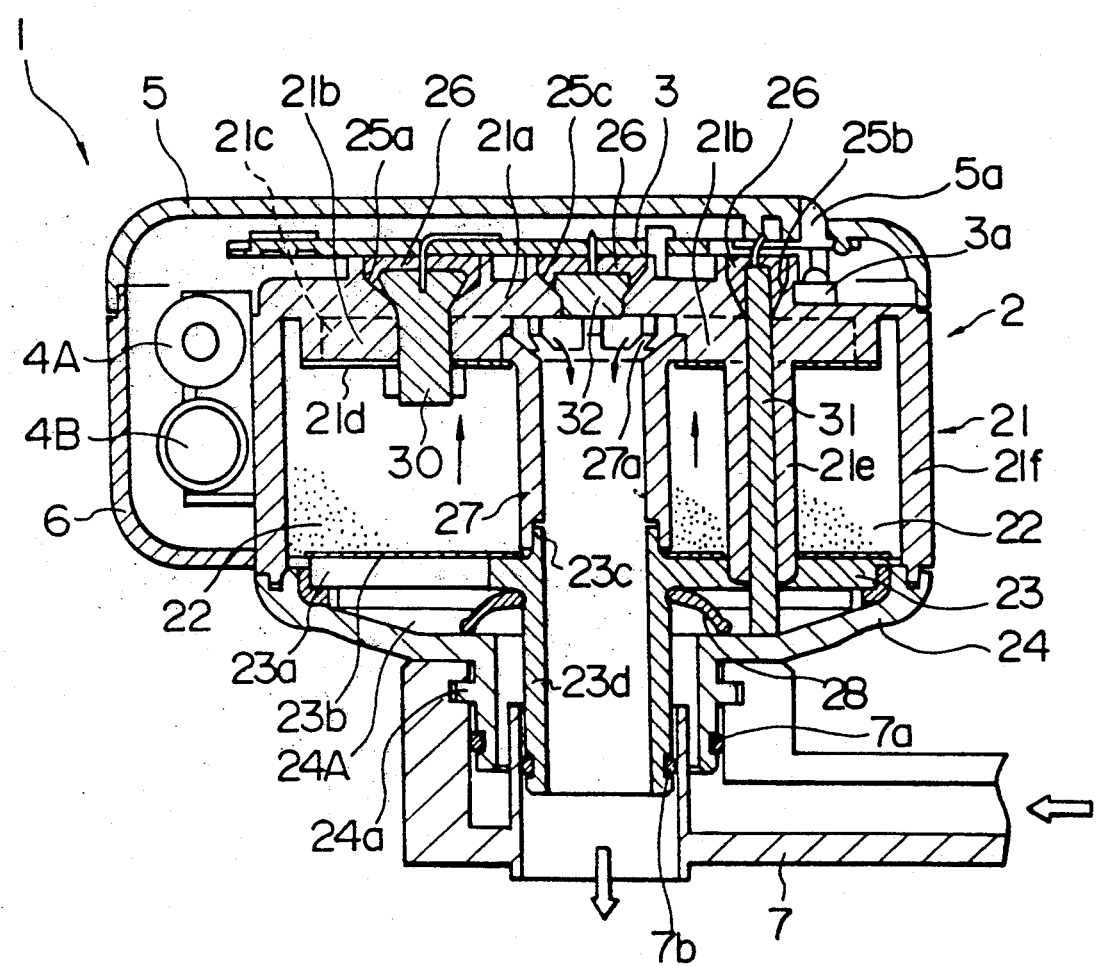
FIG. 2 is a sectional view showing a water purifier in the embodiment of the present invention.

In FIG. 2, denoted by 7a and 7b are O-rings for providing water-tightness between each of the outer lid 24 and the pipe portion 23d and the adapter 7 of a double-pipe structure.

With the water purifier 1 having the above-described construction, when water is supplied into the inflow pipe 24a through the adapter 7, the inflow water opens the check valve 28 and flows through the inflow path 24A, the inflow holes 23a, and the mesh 23b, the filter 22 where the inflow water is filtrated, the mesh 21d, the pipe member 27, the pipe portion 23d, and finally flows out of the adapter 7.

At that time, the filter unit 2 is filled with supplied water and mutual electrical conduction is established among the positive electrode 30, the negative electrode 31 and the detection electrode 32 through the supplied water.

When the water supply is stopped, the check valve 28 is closed and water in the filter 22, the inflow holes 23a and the inflow path 24A stagnates; i.e., is retained within the filter case.

At that time, water in the pipe member 27 and the pipe portion 23d operating as the outflow pipe and in the outflow paths 21c drops spontaneously and flows out of the filter case.

As a result, the electrical conduction between the positive electrode 30 and the negative electrode 31 can be continued by the presence of water in the filter 22, but the detection electrode 32 is electrically separated from both the positive and negative electrodes 30 and 31 to stop the electrical conduction therebetween.

In the filter unit 2 having the above-described construction, the respective electrodes 30, 31 and 32 are connected to the control circuit board 3 disposed between the main case 21 and the outer cover 5. Control circuit board 3 carries out predetermined operations, and a light emitting diode 3a may be activated to provide a predetermined display through a transparent window 5a disposed in the outer cover 5. The display means is not limited to a light emitting diode 3a, but could be anyone of a lamp, buzzer, chime, or other display unit within the spirit of the present invention.

The control circuit board 3 will be described with reference to the accompanying drawing.

FIG. 1 is an electric circuit diagram of the control circuit board 3, in which reference numerals 30, 31 and 32 denote the aforementioned positive, negative and detection electrodes, respectively, and reference numerals 4A and 4B represent the batteries.

A transistor TR1 acts as means for deciding whether water is supplied into the filter unit 2 or not by checking whether electrical conduction is established between the detection electrode 32 and the negative electrode 31. When electrical conduction is established between the detection electrode 32 and the negative electrode 31, the base current path is established through resistors R1 and R2, so that the transistor TR1 becomes conductive.

When the transistor TR1 is turned conductive, transistors TR2 and TR3 turn conductive and permit power supply to a transistor TR4 operating to light up the light emitting diode 3a.

An electric circuit including a transistor TR5 constitutes voltage discrimination means for deciding whether the voltage of the battery 4B is equal to or higher than a predetermined voltage value of 0.7 volt which is sufficient to suppress breeding of microorganisms within the filter 22. Display of the result of decision is made by controlling conduction of the transistor TR4 when a voltage is applied between the collector and the emitter of the transistor TR4. For this purpose, the transistor TR5 operates to vary a base current of the transistor TR4 in accordance with the result of discrimination of the magnitude the battery voltage to control conduction of the transistor TR4.

More specifically, when the voltage of the battery 4B exceeds the predetermined voltage value, the transistor TR5 is turned conductive by the base current determined by resistors R3 and R4 to drive the transistor TR4 to become conductive, which in turn lights up the light emitting diode 3a. On the contrary, when the voltage of the battery 4B is lower than the predetermined voltage value, the transistor TR4 is not rendered conductive, so that the light emitting diode 3a is not lit up.

A transistor TR6 is disposed to control conduction of a transistor TR7 which operates to apply the voltage of the battery 4B to the positive electrode 30. When the transistor TR1 is turned conductive, the transistor TR6 turns conductive and the base of a transistor TR7 is grounded, with the result that the transistor TR7 is made nonconductive, thus preventing the voltage of the battery 4B from being applied to the positive electrode 30. Conversely, with the transistor TR1 turned nonconductive, the transistor TR6 turns nonconductive and a bias voltage is applied to the base of the transistor TR7 through a resistor R6 to make the transistor TR7 conductive, thereby causing the voltage of the battery 4B to be applied to the positive electrode 30.

In FIG. 1, reference numeral 3A represents a connector terminal through which the control circuit board 3 is connected to the respective electrodes and the batteries 4A and 4B.

Figure 3:
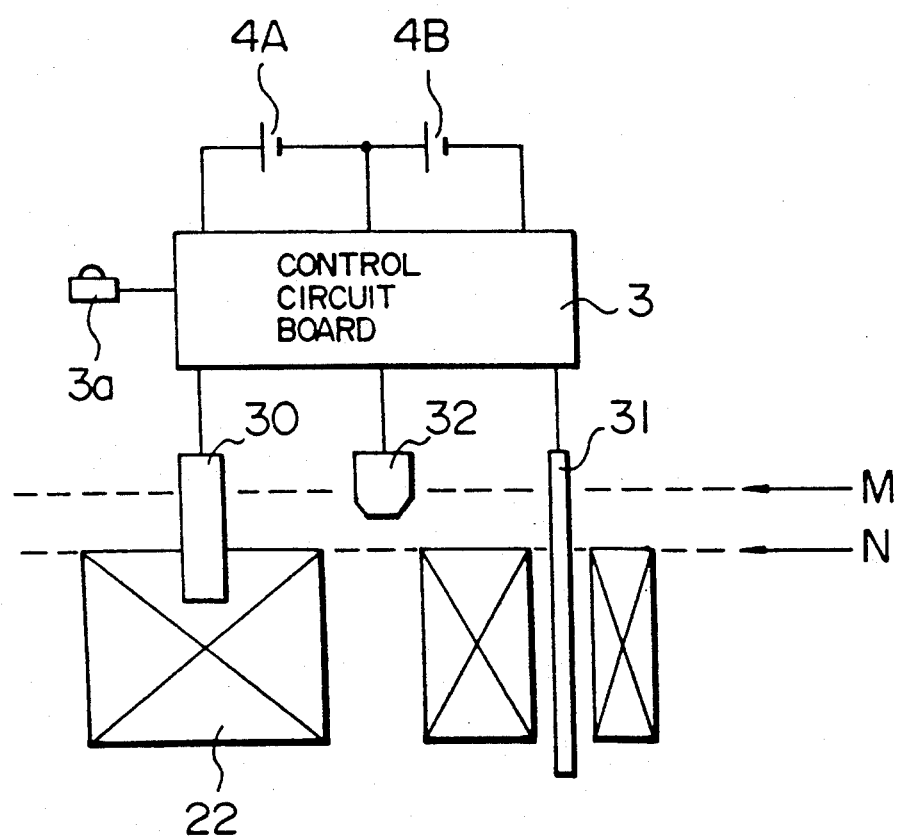
FIG. 3 is a schematic diagram showing the relation between respective electrodes and the water level in the filter unit of the embodiment of the present invention.

With the water purifier 1 of the embodiment of the present invention having the above-described construction, when water is supplied by manipulating a faucet not shown, the filter unit 2 is filled with water up to a water level shown by an arrow M in FIG. 3.

In this state, electrical conduction is established between the detection electrode 32 and the negative electrode 31 through the supplied water, and thus water flow is detected.

At this time, the transistor TR7 is made nonconductive, as described above, and the application of the voltage of the battery 4B between the positive electrode 30 including the filter 22 and the negative electrode 31 is interrupted. During the period of interruption of the application of the voltage of the battery 4B, the voltage of the battery 4B is checked as to whether it exceeds the predetermined voltage value, and, if the battery voltage is determined to be equal to or higher than the predetermined voltage value, the light emitting diode 3a is lit up, indicating that the battery 4B still retains a sufficient lifetime.

Conversely, when the voltage of the battery 4B is lower than the predetermined voltage value, the light emitting diode 3a is not lit up, indicating that the battery 4B does not retain a voltage necessary for suppressing breeding of microorganisms. This permits the user to determine easily that exchange of the battery is needed.

When the faucet is manipulated to stop water supply, the check valve 28 is closed, and water remains within the filter unit 2. At this time, water in the flowout paths 21c, the pipe member 27 and the pipe portion 23d is drained, and the water level is lowered as shown by an arrow N in FIG. 3. Hence, electrical conduction between the detection electrode 32 and the negative electrode 31 is turned off.

At this time, the transistor TR7 is made conductive as described previously, and the voltage of the battery 4B is applied between the positive electrode 30 including the filter 22 and the negative electrode 31 to suppress breeding of microorganisms.

Figure 4:
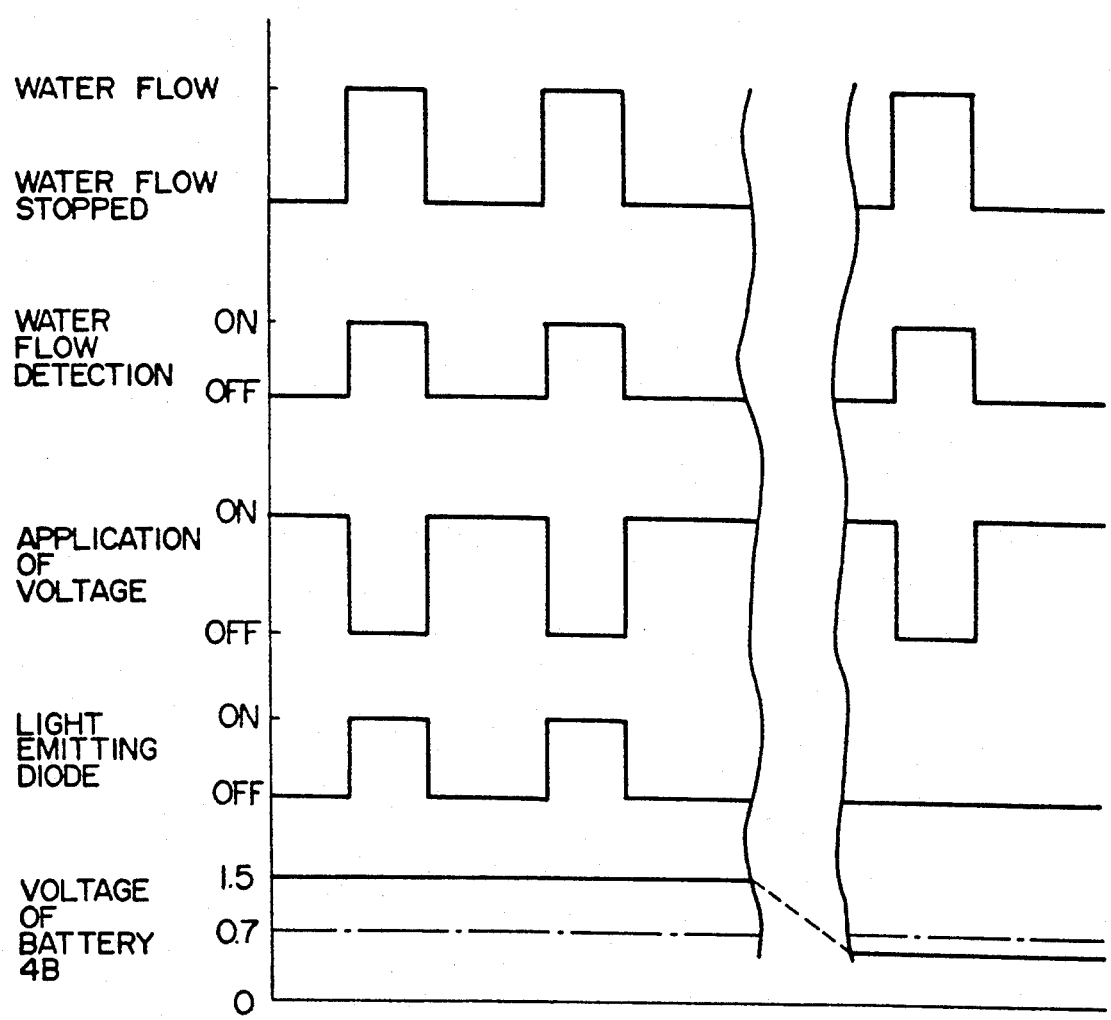
FIG. 4 is a time chart showing the operations of the water purifier of the embodiment of the present invention.

The above relation is shown schematically in the time chart of FIG. 4. In FIG. 4, the ON-state in the water flow detection curve corresponds to the electrical conduction state between the detection electrode 32 and the negative electrode 31. The ON-state in the curve of the application of voltage corresponds to the application of the voltage of the battery 4B between the positive electrode 30 including the filter 22 and the negative electrode 31.

As described above, according to the present invention, a voltage sufficient for suppressing breeding of microorganisms can be applied between the individual electrodes only when water flow is stopped, and therefore consumption of the battery can be reduced to insure long-term use thereof.

When water flows through the filter unit 2, the voltage of the battery is discriminated as to whether it exceeds the predetermined voltage value necessary for suppressing breeding of microorganisms and the result of discrimination is displayed. Whether or not the battery needs to be replaced can be determined readily.

In this case, the discrimination and display with respect the battery voltage is effected only during the water flow time period which is much shorter than the water flow stop time period. Hence, only a small amount of battery power is consumed for this purpose.

Accordingly, the lifetime of the battery is not shortened and long-term use of the battery can be ensured.

Further, in the embodiment of the present invention, the application of a voltage between the positive and negative electrodes, and the discrimination and display with respect to the magnitude of the battery voltage are effected alternately. Thus, at the time of effecting the discrimination and display with respect to the magnitude of the battery voltage, no voltage is applied between the positive and negative electrodes, and thus it can be assured that the battery voltage can be determined correctly. Furthermore, the light emitting diode requiring an amount of power more than that consumed at the time of application of the battery voltage between the positive and negative electrodes can be lit up assuredly.

We claim:

1. A water purifying apparatus comprising:
   a water channel connected with an inflow passage and an outflow passage;
   an electrically conductive filter is disposed in and fully occupying a segment of the water channel for purifying water flowing through the filter;
   a first electrode is electrically connected to the filter;
   a second electrode disposed in the filter and electrically connected to the filter via water flowing through the filter;
   voltage application means for supplying a voltage between the first and second electrodes;
   switching means for opening and closing an electrical connection between the voltage application means and at least one of the first and second electrodes; and
   a circuit board disposed above the first electrode, the second electrode and the switching means, the circuit board having a control circuit and being electrically connected to the first electrode, the second electrode, the switching means and the voltage application means for controlling to a predetermined voltage, the application of a voltage between the first and second electrode.

2. A water purifying apparatus comprising:
   a water channel connected with an inflow passage and an outflow passage;
   an electrically conductive filter disposed in and fully occupying a segment of the water channel for purifying water flowing through the filter;
   a first electrode electrically connected to the filter;
   a second electrode disposed in the filter and electrically connected to the filter via water flowing through the filter;
   voltage application means for supplying a voltage between the first and second electrodes;
   switching means for opening and closing an electrical connection between the voltage application means and at least one of the first and second electrodes; and
   wherein the filter is cylindrical with a portion of the outflow passage disposed along a central axis of the filter, and a portion of the inflow passage is annular and coaxial with a portion of the outflow passage.

3. A water purifying apparatus comprising:
   a water channel connected with an inflow passage and an outflow passage;
   an electrically conductive filter disposed in and fully occupying a segment of the water channel for purifying water flowing through the filter;
   a first electrode electrically connected to the filter;
   a second electrode disposed in the filter and electrically connected to the filter via water flowing through the filter;
   voltage application means for supplying a voltage between the first and second electrodes;
   switching means for opening and closing an electrical connection between the voltage application means and at least one of the first and second electrodes; and
   wherein the outflow passage includes,
      outflow paths disposed above one end of the filter, the outflow paths having open lower portions for receiving water flowing through the filter, the open lower portions being covered by a filter holding mesh, and
      an outflow pipe member for receiving water flowing through the outflow paths, the outflow pipe member having an upper inlet portion positioned above the filter holding mesh.

4. A water purifying apparatus comprising:
   a water channel connected with an inflow passage and an outflow passage;
   an electrically conductive filter disposed in and fully occupying a segment of the water channel for purifying water flowing through the filter;
   a first electrode electrically connected to the filter;
   a second electrode disposed in the filter and electrically connected to the filter via water flowing through the filter;
   voltage application means for supplying a voltage between the first and second electrodes;
   switching means for opening and closing an electrical connection between the voltage application means and at least one of the first and second electrodes;
   wherein the inflow passage includes a check valve disposed before inflow holes to the filter for preventing water remaining in the filter after a water flow operation from flowing from the filter to the inflow passage, and
   wherein the outflow passage includes,
      outflow paths disposed above one end of the filter, the outflow paths having open lower portions for receiving water flowing through the filter, the open lower portions being covered by a filter holding mesh; and
      outflow pipe member for receiving water flowing through the outflow paths, the outflow pipe member having an upper inlet portion positioned above the filter holding mesh.

5. A water purifying apparatus comprising:
   a water channel connected with an inflow passage and an outflow passage;

an electrically conductive filter disposed in and fully occupying a segment of the water channel for purifying water flowing through the filter;

a first electrode electrically connected to the filter;

a second electrode disposed in the filter and electrically connected to the filter via water flowing through the filter;

voltage application means for supplying a voltage between the first and second electrodes;

switching means for opening and closing an electrical connection between the voltage application means and at least one of the first and second electrodes;

a circuit board disposed above the first electrode, the second electrode and the switching means, the circuit board has a control circuit and is electrically connected to the first electrode, the second electrode, the switching means and the voltage application means for controlling to a predetermined voltage, the application of a voltage between the first and second electrode;

wherein the filter is cylindrical with a portion of the outflow passage disposed along a central axis of the filter, and a portion of the inflow passage is annular and coaxial with a portion of the outflow passage;

wherein the inflow passage includes a check valve disposed before inflow holes to the filter for preventing water remaining in the filter after a water flow operation from flowing from the filter to the inflow passage, and wherein the outflow passage includes,
outflow paths disposed above one end of the filter, the outflow paths having open lower portions for receiving water flowing through the filter, the open lower portions being covered by a filter holding mesh; and
outflow pipe member for receiving water flowing through the outflow paths, the outflow pipe member having an upper inlet portion positioned above the filter holding mesh.

6. A water purifying apparatus comprising:

a water channel connected with an inflow passage and an outflow passage;

an electrically conductive filter disposed in and fully occupying a segment of the water channel for purifying water flowing through the filter;

a first electrode electrically connected to the filter;

a second electrode disposed in the filter and electrically connected to the filter via water flowing through the filter;

voltage application means for supplying a voltage between the first and second electrodes;

switching means for opening and closing an electrical connection between the voltage application means and at least one of the first and second electrodes; and water flow detection means for detecting a flow of water through the water channel;

control means for controlling the switching means to open the electrical connection when water flow is detected and to close the electrical connection when water flow is not detected.

7. The apparatus of claim 6, wherein the water flow detection means is a single electrode.

8. The apparatus of claim 6, wherein the water flow detection means is a single electrode disposed in the outflow passage.

9. The apparatus of claim 6, further comprising:

replacement detection means for determining that the voltage application means needs replacing when the voltage of the voltage application means is less than a predetermined voltage; and display means for indicating that the voltage application means needs replacing when the replacement detection means so determines.

10. The apparatus of claim 9, wherein the control means controls the replacement detection means to operate only when water flow is detected.

11. The apparatus of claim 9, wherein the display means comprises one of a lamp, a buzzer, and a chime.

12. A water purifying apparatus comprising:

a water channel connected with an inflow passage and an outflow passage;

an electrically conductive filter disposed in and fully occupying a segment of the water channel for purifying water flowing through the filter;

a first electrode electrically connected to the filter;

a second electrode disposed in the filter and electrically connected to the filter via water flowing through the filter;

voltage application means for supplying a voltage between the first and second electrodes;

switching means for opening and closing an electrical connection between the voltage application means and at least one of the first and second electrodes effective to allow and interrupt electrical conduction between the electrodes; and wherein the filter is cylindrical with a portion of the outflow passage disposed along a central axis of the filter, and a portion of the inflow passage is annular and coaxial with a portion of the outflow passage.

* * * * *